J. F. McCLURE.
Velocipedes.

No. 157,210.  Patented Nov. 24, 1874.

WITNESSES.
P. C. Dieterich
J. B. Baker

INVENTOR
J. F. McClure
per
J. H. Alexander
ATTORNEY.

UNITED STATES PATENT OFFICE.

JAMES F. McCLURE, OF CONNERSVILLE, INDIANA.

IMPROVEMENT IN VELOCIPEDES.

Specification forming part of Letters Patent No. 157,210, dated November 24, 1874; application filed April 22, 1874.

*To all whom it may concern:*

Be it known that I, J. F. McCLURE, of Connersville, in the county of Fayette and State of Indiana, have invented certain new and useful Improvements in Velocipedes; and I do hereby declare that the following is a full, clear, and exact description thereof, reference being had to the accompanying drawings, and to the letters of reference marked thereon, which form part of this specification.

My invention is intended as an improvement upon the velocipede for which Letters Patent No. 144,551 were granted to me November 11, 1873; and it consists in the construction and arrangement of the operating mechanism, as will be hereinafter more fully set forth.

In order to enable others skilled in the art to which my invention appertains to make and use the same, I will now proceed to describe its construction and operation, referring to the annexed drawing, in which—

Figure 1:
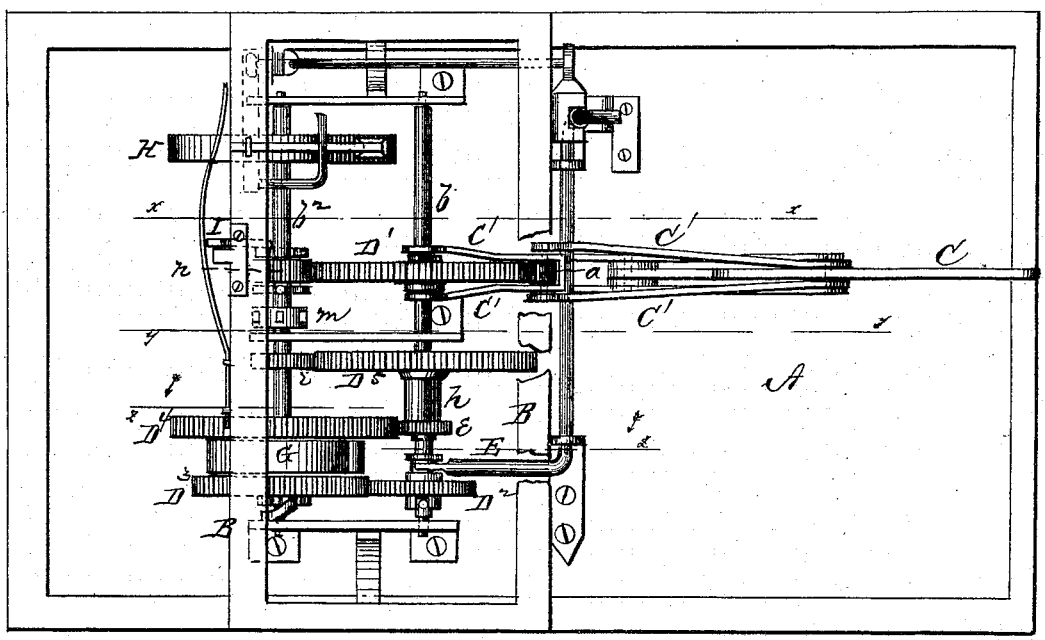
Figure 2:
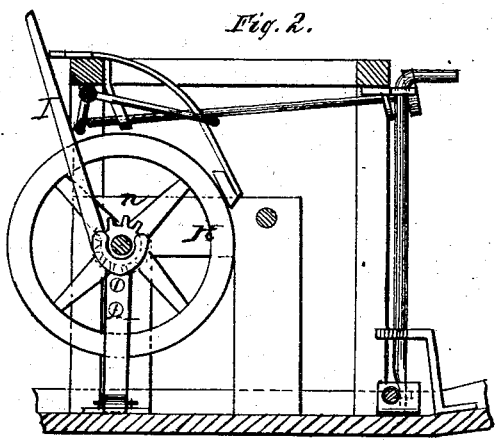
Figure 4:
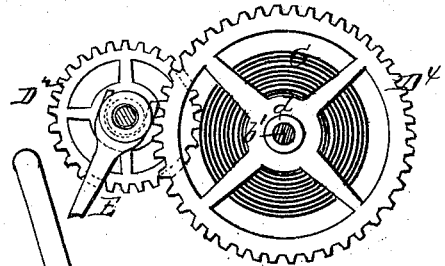
Figure 3:
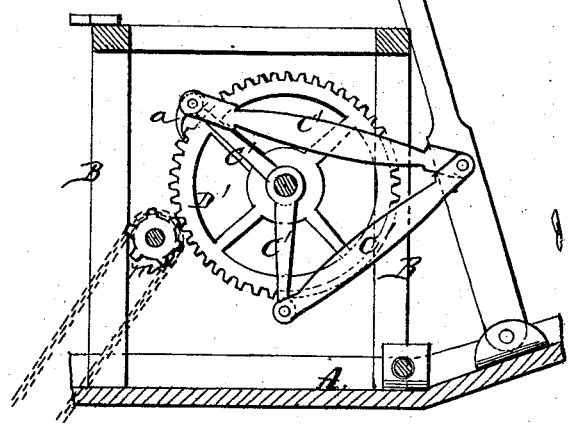

Figure 1 is a plan view of my improved velocipede. Figs. 2, 3, and 4 are transverse vertical sections of the same through the lines $x\ x$, $y\ y$, and $z\ z$, respectively, of Fig. 1.

A represents the bottom of the vehicle, and B is the seat-supporting frame on the same. C represents the lever, pivoted at one end to the bottom A, and operating, by means of the arms C′ and pawls $a$, the master-wheel $D^1$, in the same manner as described in my former patent, above referred to. The master wheel $D^1$, being propelled by the lever C, revolves with the shaft $b$, on the end of which is another wheel, $D^2$. This wheel may be thrown in and out of gear by a lever, E, with a wheel, $D^3$, which winds the spring G. The outer end of the spring is fastened to the wheel $D^3$, and the inner end to a sleeve, $d$, revolving on the shaft $b^1$, the wheel $D^3$ also revolving on said shaft. To the sleeve $d$ is permanently secured a wheel, $D^4$. The spring winding from the outside and unwinding from the inside throws the power on the wheel $D^4$, which propels a pinion, $e$, on a sleeve, $h$, upon the shaft $b$. To this sleeve is attached a wheel, $D^5$, which propels a pinion, $i$, secured on the shaft $b^2$, a pulley, $m$, and fly-wheel H being also secured on said shaft, and thus receive their motion. Over the pulley $m$ the endless chain is to pass which propels the axle of the vehicle, as described in my former patent. On the shaft $b^2$ is a loose pinion, $n$, which may be thrown in and out of gear with a pin on said shaft by a lever, I, and answers a double purpose: first, to assist in ascending a hill by having the spring wound, and throwing the wheel $D^2$ out of gear and throwing the pinion $n$ in gear, and applying the lever C to the wheel $D^1$, thereby throwing the power of both the spring and lever on the shaft $b^3$ and pulley $m$; and by throwing the wheel $D^2$ in gear it assists in winding the spring while descending. On the side of the bed is a pawl and ratchet, $p$, to hold the spring when the wheel $D^2$ is out of gear.

Having thus fully described my invention, what I claim as new, and desire to secure by Letters Patent, is—

. The combination of the gear-wheels $D^2\ D^3\ D^4\ D^5$, pinions $e\ i$, shafts $b^1\ b^3$, sleeves $d\ h$, and spring G, all as and for the purposes set forth.

In testimony that I claim the foregoing as my own I affix my signature in presence of two witnesses.

JAMES F. McCLURE.

Witnesses:
 JOHN F. UPDEGRAFF,
 FRANK W. McCLURE.